United States Patent
Kusano et al.

(10) Patent No.: US 10,370,511 B2
(45) Date of Patent: Aug. 6, 2019

(54) CATION EXCHANGE MEMBRANE AND METHOD FOR PRODUCING POTASSIUM HYDROXIDE AQUEOUS SOLUTION

(71) Applicant: AGC Inc., Chiyoda-ku (JP)

(72) Inventors: Hiromitsu Kusano, Chiyoda-ku (JP); Takayuki Kaneko, Chiyoda-ku (JP); Yasushi Yamaki, Chiyoda-ku (JP); Takayuki Endo, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 283 days.

(21) Appl. No.: 15/291,121

(22) Filed: Oct. 12, 2016

(65) Prior Publication Data

US 2017/0029585 A1   Feb. 2, 2017

Related U.S. Application Data

(63) Continuation of application No. PCT/JP2015/061749, filed on Apr. 16, 2015.

(30) Foreign Application Priority Data

Apr. 21, 2014   (JP) .................. 2014-087445

(51) Int. Cl.

| | | |
|---|---|---|
| *B01J 39/20* | (2006.01) | |
| *C08J 5/22* | (2006.01) | |
| *C08F 8/44* | (2006.01) | |
| *C25B 13/08* | (2006.01) | |
| *C25B 1/16* | (2006.01) | |
| *B01J 39/04* | (2017.01) | |
| *C01D 1/04* | (2006.01) | |
| *C25B 9/08* | (2006.01) | |
| *B01J 47/12* | (2017.01) | |
| *C08F 214/26* | (2006.01) | |

(52) U.S. Cl.
CPC .............. *C08J 5/225* (2013.01); *B01J 39/04* (2013.01); *B01J 39/20* (2013.01); *B01J 47/12* (2013.01); *C01D 1/04* (2013.01); *C08F 8/44* (2013.01); *C08F 214/262* (2013.01); *C25B 1/16* (2013.01); *C25B 9/08* (2013.01); *C25B 13/08* (2013.01); *C08J 2327/12* (2013.01); *C08J 2327/14* (2013.01); *C08J 2329/10* (2013.01)

(58) Field of Classification Search
CPC ... C08J 5/225; C01D 1/04; B01J 39/04; B01J 47/12; C08F 8/44; C08F 214/262
USPC .......................................... 524/27
See application file for complete search history.

(56) References Cited

U.S. PATENT DOCUMENTS

| | | | | |
|---|---|---|---|---|
| 4,969,982 A | * | 11/1990 | Miyake | .................. C08J 5/2281 204/252 |
| 5,128,014 A | | 7/1992 | Banerjee | |
| 5,716,504 A | * | 2/1998 | Saito | ........................ C08J 5/225 204/296 |
| 2003/0099872 A1 | | 5/2003 | Chen et al. | |
| 2004/0092611 A1 | | 5/2004 | Nishio et al. | |

FOREIGN PATENT DOCUMENTS

| | | |
|---|---|---|
| JP | 55-167050 | 12/1980 |
| JP | 57-32389 | 2/1982 |
| JP | 5-112886 | 5/1993 |
| JP | 9-78280 | 3/1997 |
| JP | 2002-538585 | 11/2002 |
| WO | WO 02/103083 A1 | 12/2002 |

OTHER PUBLICATIONS

International Search Report dated Jul. 14, 2015 in PCT/JP2015/061749, filed on Apr. 16, 2015.

* cited by examiner

*Primary Examiner* — Peter D. Mulcahy
(74) *Attorney, Agent, or Firm* — Oblon, McClelland, Maier & Neustadt, L.L.P.

(57) ABSTRACT

To provide a cation exchange membrane which is less susceptible to swelling or elongation during electrolysis of a potassium chloride aqueous solution even without permitting water absorption or swelling immediately prior to mounting it in an electrolyzer, and a method whereby it possible to stably produce a potassium hydroxide aqueous solution without necessity to conduct an operation for water absorption or swelling immediately prior to mounting the membrane in the electrolyzer. A cation exchange membrane comprising a polymer having cation exchange groups, wherein in cations (100 mol %) contained in the cation exchange membrane, the total of potassium ions and sodium ions is at least 99 mol %, and in the total (100 mol %) of potassium ions and sodium ions contained in the cation exchange membrane, the potassium ions are 80-98 mol % and the sodium ions are 20-2 mol %.

15 Claims, 1 Drawing Sheet

CATION EXCHANGE MEMBRANE AND METHOD FOR PRODUCING POTASSIUM HYDROXIDE AQUEOUS SOLUTION

This application is a continuation of PCT Application No. PCT/JP2015/061749 filed Apr. 16, 2015, which is based upon and claims the benefit of priority from Japanese Patent Application No. 2014-087445 filed on Apr. 21, 2014. The contents of those applications are incorporated herein by reference in their entireties.

TECHNICAL FIELD

The present invention relates to a cation exchange membrane, and a method for producing a potassium hydroxide aqueous solution by electrolyzing a potassium chloride aqueous solution by an ion-exchange membrane method using the cation exchange membrane.

BACKGROUND ART

As a method for producing a potassium hydroxide aqueous solution, a method is known wherein a potassium hydroxide aqueous solution is produced by electrolyzing a potassium chloride aqueous solution by an ion exchange membrane method using a cation exchange membrane as a diaphragm.

In the ion exchange membrane method, in an electrolyzer equipped with a cathode and an anode, a cation exchange membrane of potassium salt form as a diaphragm is installed to divide inside of the electrolyzer into a cathode compartment on the cathode side and an anode compartment on the anode side; and a potassium chloride aqueous solution is supplied to the anode compartment, and a potassium hydroxide aqueous solution is supplied to the cathode compartment, to electrolyze the potassium chloride aqueous solution while maintaining the concentration of the aqueous potassium hydroxide solution discharged from the cathode chamber to be at a predetermined concentration (e.g. 32 mass %).

However, in the ion-exchange membrane method using the cation exchange membrane of potassium salt form, the membrane is likely to be swollen and expanded during electrolysis of the potassium chloride aqueous solution. In the electrolyzer, the cation exchange membrane of potassium salt form is fixed along the peripheral edge to the frame, and therefore, if the membrane is swollen and expanded, wrinkles will be formed in the membrane. If wrinkles are formed in the cation exchange membrane of potassium salt form, there will be such a problem that the membrane is damaged by the contact between the membrane and the electrode, or the electrolysis voltage rises as bubbles are accumulated in the wrinkles.

As a method of suppressing formation of wrinkles in the cation exchange membrane of potassium salt form, a method has been proposed wherein just prior to installing the membrane in the electrolyzer, the membrane is permitted to absorb water and swell to bring elongation of the membrane to be from 3 to 9%, whereupon the periphery of the membrane swelled by absorption of water is fixed to the frame to install the membrane in the electrolyzer (Patent Document 1).

However, such a method has a problem that it requires a work load and site for the operation for swelling by absorption of water immediately before mounting the membrane in the electrolyzer.

PRIOR ART DOCUMENT

Patent Document

Patent Document 1: JP-A-57-32389

DISCLOSURE OF INVENTION

Technical Problem

The present invention is to provide a cation exchange membrane which is less susceptible to swelling or elongation during electrolysis of a potassium chloride aqueous solution even without permitting water absorption or swelling immediately prior to mounting it in an electrolyzer, and a method whereby it is possible to stably produce a potassium hydroxide aqueous solution without necessity to conduct an operation for water absorption or swelling immediately prior to mounting the cation exchange membrane in the electrolyzer.

SOLUTION TO PROBLEM

The cation exchange membrane of the present invention is a cation exchange membrane comprising a polymer having cation exchange groups, characterized in that in cations (100 mol %) contained in the cation exchange membrane, the total of potassium ions and sodium ions is at least 99 mol %, and in the total (100 mol %) of potassium ions and sodium ions contained in the cation exchange membrane, potassium ions are from 80 to 98 mol %, and sodium ions are from 20 to 2 mol %.

The polymer having cation exchange groups is preferably either one or both of a perfluorocarbon polymer having alkali metal salt form carboxylic acid groups and a perfluorocarbon polymer having alkali metal salt form sulfonic acid groups. The cation exchange membrane of the present invention preferably has a layer comprising the perfluorocarbon polymer having alkali metal salt form carboxylic acid groups, and a layer comprising the perfluorocarbon polymer having alkali metal salt form sulfonic acid groups The perfluorocarbon polymer having alkali metal salt form carboxylic acid groups is preferably one obtained by hydrolysis treatment of a copolymer having structural units based on a monomer represented by the following formula (1), and structural units based on a monomer represented by the following formula (2), and the perfluorocarbon polymer having alkali metal salt form sulfonic acid groups is preferably one obtained by hydrolysis treatment of a copolymer having structural units based on a monomer represented by the following formula (1), and structural units based on a monomer represented by the following formula (3):

$$CF_2=CX^1X^2 \tag{1}$$

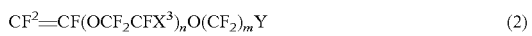
$$CF_2=CF(OCF_2CFX^3)_nO(CF_2)_mY \tag{2}$$

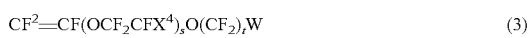
$$CF_2=CF(OCF_2CFX^4)_sO(CF_2)_tW \tag{3}$$

wherein $X^1$ and $X^2$ are each independently a fluorine atom, a chlorine atom or a trifluoromethyl group, $X^3$ is a fluorine atom or a trifluoromethyl group, m is an integer of from 1 to 5, n is 0 or 1, Y is a precursor group which can be converted to a carboxylic acid group by hydrolysis, $X^4$ is a fluorine atom or a trifluoromethyl group, s is an integer of from 1 to 3, t is an integer of from 0 to 2, and W is a precursor group which can be converted to a sulfonic acid group by hydrolysis.

The method for producing a potassium hydroxide aqueous solution of the present invention is a method for producing a potassium hydroxide aqueous solution, which comprises electrolyzing a potassium chloride aqueous solution by an ion-exchange membrane method using a cation exchange membrane, characterized in that the cation exchange membrane prior to contacting with the potassium chloride aqueous solution is the cation exchange membrane of the present invention.

ADVANTAGEOUS EFFECTS OF INVENTION

The cation exchange membrane of the present invention is less susceptible to swelling or elongation during electrolysis of a potassium chloride aqueous solution even without being swelled by absorption of water immediately before mounting it in the electrolyzer.

According to the method for producing a potassium hydroxide aqueous solution of the present invention, it is unnecessary to conduct an operation to permit the membrane to swell by absorption of water immediately before mounting it in the electrolyzer, and it is possible to stably produce the potassium hydroxide aqueous solution.

DESCRIPTION OF EMBODIMENTS

Figure 1:
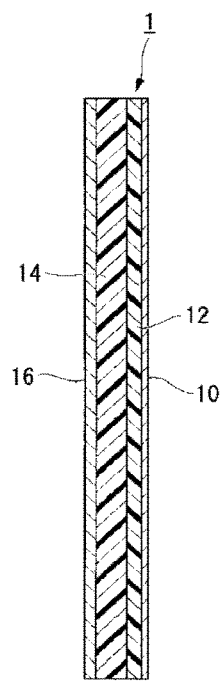
FIG. 1 is a cross-sectional view showing an example of the cation exchange membrane of the present invention.

In this specification, a monomer represented by the formula (1) will be referred to as a monomer (1). Monomers represented by other formulae will be referred to in the same manner.

The following definitions of terms are applicable throughout the specification including claims.

A "cation exchange group" is a group in which at least some of cations contained in the group can be ion-exchanged with other cations.

An "alkali metal salt form carboxylic acid group" is a group represented by —COOM (where M is an alkali metal).

An "alkali metal salt form sulfonic acid group" is a group represented by —SO$_3$M (where M is an alkali metal).

A "fluoropolymer" means a polymer compound having fluorine atom(s) in the molecule.

A "perfluorocarbon polymer" means a polymer in which all of hydrogen atoms bonded to carbon atoms in the polymer are substituted by fluorine atoms. Some of fluorine atoms in the perfluorocarbon polymer may be substituted by chlorine atoms or bromine atoms.

A "monomer" means a compound having a carbon-carbon double bond having a polymerization reactivity.

A "structural unit" means a unit derived from a monomer, formed by polymerization of the monomer. The structural unit may be a unit which is directly formed by a polymerization reaction of the monomer, or may be a unit formed by treating a polymer so that a part of its units is converted to another structure.

A "precursor group" means a group that can be converted to a cation exchange group by known treatment such as hydrolysis treatment, treatment for acid form, etc.

The "primary particles" means the smallest particles as observed by a scanning electron microscope (SEM). Whereas, the "secondary particles" means particles in which primary particles are aggregated.

<Cation Exchange Membrane>

The cation exchange membrane of the present invention is a membrane comprising a polymer having cation exchange groups.

The cation exchange groups may, for example, be carboxylic acid groups, sulfonic acid groups, sulfonimide groups, sulfonmethide groups, etc., and from the viewpoint of ion selectivity and industrial productivity, carboxylic acid groups or sulfonic acid groups are preferred. As the cation exchange groups, an acid form and a salt form may be mentioned, but at the time of producing a potassium hydroxide aqueous solution by an ion exchange membrane process, the cation exchange groups are in an alkali metal salt form.

The polymer having cation exchange groups may, for example, be a fluoropolymer having cation exchange groups, a hydrocarbon-type polymer having cation exchange groups, etc., and, from the viewpoint of chemical durability of the membrane, a fluoropolymer having cation exchange groups is preferred.

From the viewpoint of chemical durability of the membrane, the fluoropolymer having cation exchange groups is preferably a perfluorocarbon polymer having cation exchange groups (which may contain an etheric oxygen atom), particularly preferably a copolymer containing units based on tetrafluoroethylene and units based on a perfluorovinyl ether having a cation exchange group.

In cations (100 mol %) contained in the cation exchange membrane, the total of potassium ions and sodium ions is at least 99 mol %, more preferably at least 99.5 mol %. When the total of potassium ions and sodium ions is at least 99 mol %, such is suitable for a cation exchange membrane for use in the method for producing a potassium hydroxide aqueous solution by an ion exchange membrane method.

In the total (100 mol %) of potassium ions and sodium ions contained in the cation exchange membrane, potassium ions are preferably from 80 to 98 mol %, more preferably from 90 to 98 mol %, further preferably from 95 to 98 mol %. Whereas, sodium ions are preferably from 20 to 2 mol %, more preferably from 10 to 2 mol %, further preferably from 5 to 2 mol %. When potassium ions are at least 80 mol % (sodium ions are at most 20 mol %), shrinkage of the membrane will be suppressed. As a result, when the membrane is mounted in the electrolyzer, and liquids are supplied (the anode compartment: potassium chloride aqueous solution, and the cathode compartment: potassium hydroxide aqueous solution), it is possible to prevent cracks, pinholes, etc. to be caused by shrinkage of the membrane in a state where the peripheral edge is fixed to the frame. When potassium ions are at most 98 mol % (sodium ions are at least 2 mol %), swelling and elongation of the membrane will be suppressed. As a result, it is possible to prevent wrinkles, etc., which are, otherwise, likely to be formed by swelling and elongation of the membrane, of which the periphery is fixed to the frame in the electrolyzer.

The amounts of potassium ions and sodium ions contained in the cation exchange membrane are obtained by washing the membrane of 3 cm×3 cm with ion exchanged water at 90° C. for 16 hours, then immersing the membrane in 50 mL of a 1N hydrogen chloride aqueous solution at 90° C. for 16 hours to obtain an extract, and then, measuring the concentrations (mol/L) of the respective cations in the extract by atomic absorption.

In the cation exchange membrane, a reinforcing material may be embedded.

The reinforcing material may, for example, be a woven fabric, a nonwoven fabric, fibril, porous material, etc., and from the viewpoint of strength, a woven fabric is preferred. The material for the reinforcing material may, for example, be a fluoropolymer such as polytetrafluoroethylene (hereinafter referred to also as PTFE).

The cation exchange membrane may be a single layer or may be a multilayer.

The cation exchange membrane may have a gas release layer on one or both of the outermost layers.

(First Embodiment)

FIG. 1 is a cross-sectional view showing a first embodiment of the cation exchange membrane of the present invention.

A cation exchange membrane 1 is one wherein a gas release layer (α2) 10, a layer (α1) 12 comprising a perfluorocarbon polymer (A) having alkali metal salt form carboxylic acid groups (hereinafter referred to also as polymer (A)), a layer (β1) 14 comprising a perfluorocarbon polymer (B) having alkali metal salt form sulfonic acid groups (hereinafter referred to also as polymer (B)) and a gas release layer (β2) 16, are laminated in this order.

The cation exchange membrane 1 is disposed in the electrolyzer, so that the gas release layer (α2) 10 faces the cathode, the gas release layer (β2) 16 faces the anode. The shape and size of the cation exchange membrane 1 may suitably be determined depending on the electrolyzer in which the cation exchange membrane 1 is to be mounted.

(Layer (α1))

The layer (α1) 12 is a layer comprising a polymer (A). The layer (α1) 12 may be a layer having a reinforcing material embedded therein. From the viewpoint of the electrolysis performance, the layer (α1) 12 is preferably a layer consisting only of the polymer (A) i.e. not containing a material other than the polymer (A) (such as a reinforcing material). The layer (α1) 12 may be a single layer or a multilayer.

The polymer (A) is preferably a polymer obtained by subjecting a copolymer having structural units based on the following monomer (1) and structural units based on the following monomer (2) to hydrolysis treatment, to convert Y to —COOM (where M is an alkali metal).

$$CF_2=CX^1X^2 \quad (1)$$

$$CF_2=CF(OCF_2CFX^3)_nO(CF_2)_mY \quad (2)$$

$X^1$ and $X^2$ are each independently a fluorine atom, a chlorine atom or a trifluoromethyl group, and from the viewpoint of the durability of the membrane, a fluorine atom is preferred.

The monomer (1) may, for example, be $CF_2=CF_2$, $CF_2=CFCl$, $CF_2=CFCF_3$, etc., and from the viewpoint of the chemical durability of the membrane, $CF_2=CF_2$ is preferred.

$X^3$ is a fluorine atom or a trifluoromethyl group.

m is an integer of from 1 to 5.

n is 0 or 1.

Y is a precursor group which can be converted to a carboxylic acid group by hydrolysis. Y is preferably —COOR[1] (where R[1] is an alkyl group having 1 to 4 carbon atoms), —CN or —COZ (where Z is a halogen atom), more preferably —COOR[1], particularly preferably —COOCH_3.

As the monomer (2), from the viewpoint of ion selectivity and industrial productivity, the following compounds are preferred.

$CF_2=CFOCF_2CF(CF_3)OCF_2CF_2COOCH_3$, $CF_2=CFOCF_2CF_2COOH_3$, $CF_2=CFOCF_2CF_2CF_2COOH_3$, $CF_2=CFOCF_2CF_2CF_2OCF_2CF_2COOCH_3$, $CF_2=CFOCF_2CF_2CF_2CF_2CF_2COOCH_3$, $CF_2=CFOCF_2CF(CF_3)OCF_2CF_2CF_2COOCH_3$.

The ion exchange capacity of the layer (α1) 12 is preferably from 0.7 to 1.1 meq/g dry resin, more preferably from 0.8 to 1.1 meq/g dry resin. When the ion exchange capacity is at least 0.7 meq/g dry resin, the electrical resistance of the membrane will be low, and it is possible to lower the electrolysis voltage. When the ion exchange capacity is at most 1.1 meq/g dry resin, synthesis of a high molecular weight polymer will be easy, and it is possible to suppress swelling of the polymer.

The thickness of the layer (α1) 12 is preferably from 5 to 50 μm, more preferably from 10 to 35 μm. When the thickness of the layer (α1) 12 is at least 5 μm, the concentration of potassium chloride on the cathode side, permeated from the anode side, will be suppressed, and the quality of the aqueous potassium hydroxide solution will not be impaired as a product. When the thickness of the layer (α1) 12 is at most 50 μm, the electrical resistance of the membrane will be low, and it is possible to lower the electrolysis voltage.

(Gas Release Layer (α2))

The gas release layer (α2) 10 is a layer comprising inorganic particles (hereinafter referred to also as inorganic particles (P)) and a binder. By providing the gas release layer (α2) 10, it is possible to prevent a gas from depositing on the cathode side surface of the cation exchange membrane 1, so that during the electrolysis of the potassium chloride aqueous solution, it is possible to prevent the electrolysis voltage from becoming high. Further, the gas release layer (α2) 10 is excellent in resistance against dropping of inorganic particles (P), and even if friction with other members, etc. occurs, inorganic particles (P) are less likely to fall off, whereby a gas deposition inhibitory effect can be stably obtained.

The inorganic particles (P) are preferably ones having excellent corrosion resistance against of the potassium chloride aqueous solution, etc. and hydrophilicity. Specifically, they are preferably at least one member selected from the group consisting of oxides, nitrides and carbides of Group 4 elements or Group 14 elements, more preferably $SiO_2$, SiC, $ZrO_2$ or ZrC, particularly preferably $ZrO_2$.

The average primary particle diameter of the inorganic particles (P) is preferably from 0.01 to 1 μm, more preferably from 0.02 to 0.4 μm. When the average primary particle diameter of the inorganic particles (P) is at least 0.01 μm, non-uniformity by aggregation will be less. When the average primary particle diameter of the inorganic particles (P) is at most 1 μm, non-uniformity by poor dispersion will be less. The primary particle diameter was observed with a scanning electron microscope (SEM), and with respect to 30 particles arbitrarily selected from the SEM image, the particle diameters were measured by means of an image size measurement software (Pixs2000 PRO, manufactured by Innotech Corporation), whereupon their average value was taken as the average primary particle diameter.

The average secondary particle diameter of the inorganic particles (P) is preferably from 0.5 to 1.5 μm, more preferably from 0.7 to 1.3 µm. When the average secondary particle diameter of the inorganic particles (P) is at least 0.5 µm, a high gas deposition inhibitory effect can be obtained. When the average secondary particle diameter of the inorganic particles (P) is at most 1.5 µm, the resistance against dropping of inorganic particles (P) will be excellent. For the secondary particle diameter, the inorganic particles were dispersed in ethanol so that the concentration would be at most 0.01 mass %, followed by the measurement using Microtrac (UPA-150, manufactured by Nikkiso Co., Ltd.), whereby a particle diameter (D50) at a point where the cumulative volume became 50% in the cumulative volume distribution curve for the total volume of the obtained particle size distribution being 100%, was taken as the average secondary particle diameter.

The binder is preferably one having hydrophilicity and excellent corrosion resistance against the potassium chloride aqueous solution, etc., and a fluoropolymer (C) having carboxylic acid groups or sulfonic acid groups is preferred, and a fluoropolymer (C) having sulfonic acid groups is more preferred. The fluoropolymer (C) may be a homopolymer of a monomer having a carboxylic acid group or sulfonic acid group, or a copolymer of a monomer having a carboxylic acid group or sulfonic acid group, and another monomer copolymerizable therewith.

The fluoropolymer (C) having carboxylic acid groups may, for example, be a polymer obtained by subjecting a copolymer having structural units based on a monomer (1) and structural units based on a monomer (2) to hydrolysis treatment, followed by treatment for an acid form to convert Y to —COOH.

The fluoropolymer (C) having sulfonic acid groups may, for example, be a polymer obtained by subjecting a copolymer having structural units based on a monomer (1) and structural units based on a monomer (3) to hydrolysis treatment, followed by treatment for an acid form to convert W to —SO$_3$H.

In the gas release layer (α2) 10, the mass ratio of the binder (hereinafter referred to as the binder ratio) to the total mass of the inorganic particles (P) and the binder, is preferably from 0.15 to 0.3, more preferably from 0.15 to 0.25, further preferably from 0.16 to 0.20. When the binder ratio in the gas release layer (α2) 10 is at least 0.15, the resistance against dropping of the inorganic particles (P) will be excellent. When the binder ratio in the gas release layer (α2) 10 is at most 0.3, a high gas deposition inhibitory effect can be obtained.

(Layer (β1))

The layer (β1) 14 is a layer comprising a polymer (B). The layer (β1) 14 is preferably a layer having a reinforcing material embedded therein, from such a viewpoint that the strength of the cation exchange membrane 1 will be thereby increased. When a reinforcing material is to be embedded, by embedding it in the layer (β1) 14 rather than the layer (α1) 12, it is possible to obtain a reinforcing effect without affecting the electrolysis performance. The layer (β1) 14 may be a single layer or a multilayer. When a reinforcing material is to be embedded in the layer (β1) 14, it is preferred to embed it by making the layer (β1) 14 to be multi-layered and by inserting the reinforcing material in any of its interlayers during its production.

The polymer (B) is preferably a polymer obtained by subjecting a copolymer having structural units based on the above monomer (1) and structural units based on the following monomer (3) to hydrolysis treatment, to convert W to —SO$_3$M (where M is an alkali metal).

$$CF_2=CF(OCF_2CFX^4)_sO(CF_2)_tW \quad (3)$$

X$^4$ is a fluorine atom or a trifluoromethyl group.

s is an integer of from 1 to 3.

t is an integer of from 0 to 2.

W is a precursor group which can be converted to a sulfonic acid group by hydrolysis. W is preferably —SO$_2$X$^5$ (where X$^5$ is a fluorine atom, a chlorine atom or a bromine atom) or —SO$_2$R$^2$ (where R$^2$ is an alkyl group having from 1 to 4 carbon atoms), more preferably —SO$_2$X$^5$, particularly preferably —SO$_2$F.

As the monomer (3), from the viewpoint of strength properties and industrial productivity, the following compounds are preferred.

$$CF_2=CFOCF_2CF(CF_3)OCF_2CF_2CF_2SO_2F,$$

$$CF_2=CFOCF_2CF(CF_3)OCF_2CF_2SO_2F,$$

$$CF_2=CFOCF_2CF_2CF_2SO_2F,$$

$$CF_2=CFOCF_2CF_2SO_2F.$$

The ion exchange capacity of the layer (β1) 14 is preferably from 0.9 to 1.15 meq/g dry resin, more preferably from 1.0 to 1.15 meq/g dry resin. When the ion exchange capacity is at least 0.9 meq/g dry resin, the electrical resistance of the membrane becomes low, and it is possible to lower the electrolysis voltage. When the ion exchange capacity is at most 1.15 meq/g dry resin, synthesis of a high molecular weight polymer will be easy, and it is also possible to prevent swelling of the polymer.

With a view to preventing peeling between the layer (α1) 12 and the layer (β1) 14, the difference in ion exchange capacity between the layer (α1) 12 and the layer (β1) 14 is preferably as small as possible. The difference in ion exchange capacity is preferably from 0.1 to 0.45 and more preferably from 0.1 to 0.35.

When a reinforcing material is to be embedded in the layer (β1) 14, from such a viewpoint that the electrolysis voltage can easily be reduced, the ion exchange capacity of the portion of the layer (β1) 14 on the anode side of the reinforcing material is preferably equal to or higher than the ion exchange capacity of the portion on the cathode side of the reinforcing material. The difference between them is, for example, preferably at least 0.1 meq/g dry resin.

When the layer (β1) is made to be multilayered, the polymers (B) forming the respective layers may be the same or different.

The total thickness of the layer (β1) 14 is preferably from 55 to 200 µm, more preferably from 70 to 160 µm. When the total thickness of the layer (β1) 14 is at least 55 µm, the membrane becomes to have a sufficient strength and can withstand long-term electrolysis. When the total thickness of the layer (β1) 14 is at most 200 µm, it is possible to sufficiently lower the electrolysis voltage.

When a reinforcing material is embedded in the layer (β1) 14, the thickness of the portion on the anode side of the reinforcing material in the layer (β1) 14 is preferably from 10 to 60 µm, more preferably from 10 to 50 µm. When the thickness of the portion on the anode side is at least 10 µm, the reinforcing material can easily be embedded in the layer (β1) 14 and delamination can be suppressed. When the thickness of the portion on the anode side is at most 60 µm, the electrical resistance of the membrane will be low, and it is possible to lower the electrolysis voltage.

When a reinforcing material is embedded in the layer (β1) 14, the thickness on the cathode side of the reinforcing material in the layer (β1) 14 is preferably from 45 to 140 µm, more preferably from 60 to 100 µm.

(Gas Release Layer (β2))

As the gas release layer (β2) 16, it is possible to employ a known gas release layer to be provided on the anode side of a cation exchange membrane to be used in electrolysis of a potassium chloride aqueous solution.

The gas release layer (β2) 16 may, for example, be a layer comprising inorganic particles and a binder. The inorganic particles may be the same as the inorganic particles (P) mentioned for the gas release layer (α2). As the binder, it is possible to employ a known binder to be used in a gas release layer on the anode side. For example, methyl cellulose, etc. may be mentioned.

(Method for Producing Cation Exchange Membrane)

Now, an example of the method for producing the cation exchange membrane 1 will be described below.

As the method for producing the cation exchange membrane 1, for example, a method comprising the following steps (a) to (d) may be mentioned.

(a) A step of obtaining a precursor for a composite membrane, by laminating a gas release layer (β2) 16, a layer (β1') comprising a precursor for a polymer (B) (hereinafter referred to as polymer (B')) and a layer (α1') comprising a precursor for a polymer (A) (hereinafter referred to as polymer (A')) in this order.

Figure 2:
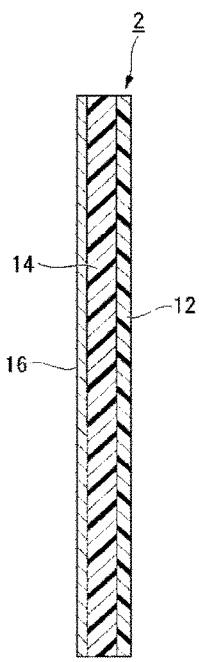
FIG. 2 is a cross-sectional view showing an example of a composite membrane obtained in the course of producing the cation exchange membrane of the present invention.

(b) A step of obtaining a composite membrane 2 having a gas release layer (β2) 16, a layer (β1) 14 and a layer (α1) 12 laminated in this order as shown in FIG. 2, by hydrolyzing precursor groups for carboxylic acid groups and precursor groups for sulfonic acid groups in the above precursor for the composite membrane, to convert them respectively to alkali metal salt form carboxylic acid groups and alkali metal salt form sulfonic acid groups.

(c) A step of applying a coating liquid (hereinafter referred to also as a coating solution (D)) comprising inorganic particles (P), a binder and a dispersion medium on the surface of the layer (α1) 12 in the composite membrane 2 to form a gas release layer (α2) 10, to obtain a cation exchange membrane 1.

(d) A step of adjusting the amounts of potassium ions and sodium ions contained in the cation exchange membrane 1 to be within the specific ranges.

(Step (a))

As the method for obtaining a precursor for the composite membrane 2, a known method may be employed.

(I) In a case where both the layer (α1) 12 and the layer (β1) 14 are single-layers, the following method may, for example, be employed as a method for obtaining a precursor for the composite membrane.

(i) A laminated film of the structure of layer (α1')/layer (β1') is obtained by a co-extrusion method using a polymer (A') and a polymer (B').

(ii) A paste having inorganic particles dispersed in a dispersion medium (such as a methyl cellulose aqueous solution), is applied to the surface of an auxiliary material (such as a polyethylene film, a polyethylene terephthalate film, etc.), followed by drying to obtain a gas release layer-attached auxiliary material provided with a gas release layer (β2) 16.

(iii) The laminated film and the gas release layer-attached auxiliary material are laminated so that the gas release layer (β2) 16 faces the layer (β1'), followed by heat-press bonding to obtain a precursor for a composite membrane.

The auxiliary material may be peeled off before the finally obtained cation exchange membrane 1 is subjected to hydrolysis treatment. The gas release layer (β2) 16 is preferably formed by using an auxiliary material as described above, since the formation is thereby easy. Here, the gas release layer (β2) 16 may be formed in the same manner as in step (c) described hereinafter.

As the method for application of the paste, a gravure roll method may, for example, be mentioned.

As the method for heat-press bonding the films to each other, a method of using a laminated layer roll made of a pair of metal rolls and a rubber-lined roll, may, for example, be mentioned.

(II) In a case where the layer (α1) 12 is a multilayer, the following method may be mentioned as a method for obtaining a precursor for the composite membrane.

(i) A laminated film of the structure of polymer (A') layer/layer (β1') is obtained by a co-extrusion method using a polymer (A') and a polymer (B').

(ii) A paste having inorganic particles dispersed in a dispersion medium (such as a methyl cellulose aqueous solution), is applied to the surface of an auxiliary material (such as a polyethylene film, a polyethylene terephthalate film, etc.), followed by drying to obtain a gas release layer-attached auxiliary material provided with a gas release layer (β2) 16.

(iii) On the polymer (A') layer side of the laminated film, a single-layer film obtained by an extrusion method using the polymer (A'), is overlaid in a necessary number, and on the layer (β1') side, the gas release layer-attached auxiliary material is overlaid, followed by heat-press bonding them to obtain a precursor for a composite membrane.

The number of stacked single-layer films of the polymer (A') may be adjusted appropriately depending upon the layer structure of the layer (α1) 12. Further, in the case of embedding a reinforcing material in the layer (α1) 12, it is possible to embed the reinforcing material by inserting the reinforcing member between any single-layer films forming the layer (α1') at the time of overlaying the single-layer films, followed by the heat-press bonding.

The heat-press bonding between the respective films may be carried out in multiple stages by a plurality of times.

(III) In a case where the layer (β1) 14 is multilayered, the following method may, for example, be mentioned as a method for obtaining a precursor for the composite membrane.

(i) A laminated film of the structure of layer (α1')/polymer (β1') layer is obtained by a co-extrusion method using a polymer (A') and a polymer (B').

(ii) A paste having inorganic particles dispersed in a dispersion medium (such as a methyl cellulose aqueous solution) is applied to the surface of an auxiliary material (such as a polyethylene film, a polyethylene terephthalate film, etc.), followed by drying, to obtain a gas release layer-attached auxiliary material provided with a gas release layer (β2) 16.

(iii) On the polymer (B') layer side of the laminated film, a single-layer film obtained by an extrusion method using the polymer (B') is overlaid in a necessary number, and further, on the single-layer film side, the gas release layer-attached auxiliary material is overlaid, followed by heat-press bonding them, to obtain a precursor for a composite membrane.

The number of overlaid single-layer films of the polymer (B') may be adjusted appropriately depending upon the layer structure of the layer (β1)14. Further, in the case of embedding a reinforcing material in the layer (β1) 14, it is possible to embed the reinforcing material by inserting the reinforcing member between any single-layer films forming the layer (β1') at the time of overlaying the respective single-layer films, followed by the heat-press bonding.

The heat-press bonding between the respective films may be carried out in multiple stages by a plurality of times.
(Step (b))

The precursor groups for carboxylic acid groups and the precursor groups for sulfonic acid groups in the precursor for the composite membrane, are hydrolyzed to convert them to alkali metal salt form carboxylic acid groups and alkali metal salt form sulfonic acid groups, respectively.

As the method for hydrolyzing the precursor groups, a known method may be employed. For example, a method disclosed in JP-A-1-140987 may be mentioned. As a method for hydrolyzing the precursor groups, a method of using a mixture of a water-soluble organic compound (such as dimethylsulfoxide) and an alkali metal hydroxide (such as potassium hydroxide) is preferred.

It is preferred to carry out step (b) prior to step (c), from such a viewpoint that in step (c), adhesion of the coating solution (D) becomes better, adhesion to the layer (α1) 12 will be excellent, and it will be easy to form a gas release layer (α2) 10 excellent in resistance against dropping of inorganic particles (P).

On the other hand, it is preferred to carry out step (b) after step (c), from such a viewpoint that, with the precursor groups for carboxylic acid groups rather than carboxylic acid groups, an adverse effect due to the dispersion medium of the coating solution (D) is smaller, it tends to be easy for the layer (α1) 12 to express its characteristics, and the process is easy.
(Step (c))

On the surface of the layer (α1) 12 in the composite membrane 2, a coating solution (D) comprising inorganic particles (P), a binder and a dispersion medium, is applied. Thereafter, the dispersion medium is removed by e.g. heating, followed by drying, to form a gas release layer (α2) 10. The method for preparing the coating solution (D) is preferably a method wherein inorganic particles (P), a binder and a dispersion medium are mixed and made uniform by stirring with e.g. a ball mill, followed by dispersion treatment by a bead mill. By using such a method, it is easy to control the average secondary particle diameter of inorganic particles (P) to be within a range of from 0.5 to 1.5 μm.

The average secondary particle diameter of inorganic particles (P) in the coating solution (D) may be controlled by adjusting the average primary particle diameter of inorganic particles (P), the treating time for the dispersion treatment, etc.

In a case where the binder is a fluoropolymer (C) having sulfonic acid groups, the dispersion medium is preferably an alcohol solvent (such as ethanol, isopropyl alcohol, etc.).

Further, as the dispersion medium, an aprotic polar solvent may be used such as dim ethyl sulfoxide (hereinafter referred to as DMSO), formamide, N,N-dimethylacetamide, N,N-dimethylformamide, etc. The aprotic polar solvent is preferably one having a boiling point of at least 140° C. and at most the melting point of the polymer (A) or the polymer (B), and having a melting point of at most 25° C.

In the case of using an aprotic polar solvent as the dispersion medium, a coating solution (D) having the aprotic polar solvent blended may be prepared and applied, or a coating solution (D) using a dispersion medium (such as an alcohol solvent) other than an aprotic polar solvent may be prepared and applied, whereupon the aprotic polar solvent may be applied.

The content of the dispersion medium in the coating solution (D) (100 mass %) is preferably from 30 to 95 mass %, more preferably from 70 to 90 mass %. When the content of the dispersion medium is within the above range, the dispersibility of the binder will be good, and also the viscosity will be proper, such being suitable for the case of applying the coating solution (D) by a spray method.

In the case of using an aprotic polar solvent as the dispersion medium, the content of the aprotic polar solvent in the coating solution (D) (100 mass %) is preferably from 1 to 70 mass %, more preferably from 10 to 50 mass %.

As a method of applying the coating solution (D), a known coating method may be employed. For example, a spray method or a roll coater method may be mentioned, and a spray method is preferred. In a case where step (c) is carried out before step (b), the spray method is preferred from such a viewpoint that adhesion of the coating solution (D) becomes better, and it is particularly preferred to reduce the amount of air in the spray method.

As the heating method, a method of using a heating roll, or a method of using an oven may, for example, be mentioned. Industrially, a method of conducting heat treatment continuously by using a roll press machine provided with a heat roll, is preferred.

When a roll press machine is to be used, the pressure to be applied is preferably adjusted to be a linear pressure of at most 0.2 MPa, more preferably within a linear pressure range of from 0.1 to 0.2 MPa with a view to reduction of power.

The heating temperature is preferably at least 30° C., more preferably higher than the boiling point of the dispersion medium to be used. If the heating temperature is lower than the boiling point of the dispersion medium, the dispersion medium is likely to remain on the membrane surface, but depending on the type of the dispersion medium, from the relation of the vapor pressure, it is possible to sufficiently volatilize the dispersion medium by heating at the boiling point or less.

Further, the heating temperature is preferably lower than the melting points of the polymer (A) and the polymer (B), whereby it becomes easier to prevent the film thickness from becoming non-uniform.
(Step (d))

The amounts of potassium ions and sodium ions contained in the cation exchange membrane are adjusted so that the total of potassium ions and sodium ions would be at least 99 mol % in cations (100 mol %) contained in the cation exchange membrane 1, and so that in the total (100 mol %) of potassium ions and sodium ions contained in the cation exchange membrane, potassium ions would be from 80 to 98 mol %, and sodium ions would be from 20 to 2 mol %.

The adjustment method may, for example, be a method of immersing the cation exchange membrane 1 in an aqueous solution containing potassium ions and sodium ions at the desired proportions; or a method of immersing in an aqueous solution containing potassium ions at the desired concentration, and then immersing in an aqueous solution containing sodium ions at the desired concentration. Here, the desired concentration is, in the case of potassium ions, a 10-20 mass % aqueous solution, preferably a 10-15 mass % aqueous solution, and in the case of sodium ions, a 0.2-2 mass % aqueous solution, preferably a 0.2-1 mass % aqueous solution.

As the aqueous solution containing potassium ions and sodium ions, from the viewpoint of safety of operation, an aqueous solution containing potassium chloride and sodium chloride is preferred.

The immersion time is preferably from 3 to 10 minutes, more preferably from 6 to 10 minutes. The immersion temperature is preferably from 30 to 50° C., more preferably from 40 to 50° C.

(Other Embodiments)

It should be noted the cation exchange membrane of the present invention is not limited to the cation exchange membrane of the first embodiment.

For example, it may be one which does not have either one or both of the gas release layers.

Otherwise, it may be a single-layered cation exchange membrane.

Otherwise, as to the method for producing the cation exchange membrane, the method may be such that step (b) is conducted after conducting step (c).

Otherwise, step (b) may not be carried out in a case where in step (a), a polymer (A) and a polymer (B) are used.

Otherwise, the method may be such that after forming the gas release layer ($\alpha$2) by the coating solution (D) on the surface of the layer ($\alpha$1) of the laminated film of layer ($\alpha$1) and layer ($\beta$1), the gas release layer ($\beta$2) is laminated on the surface of the layer ($\beta$1).

Otherwise, the gas release layer ($\beta$2) may be formed by a method of forming by applying the coating solution (D) in the same manner as the gas release layer ($\alpha$2).

(Mechanism of Effects)

In the fluorinated cation exchange membrane of the present invention as described above, the amounts of potassium ions and sodium ions contained in the cation exchange membrane, are within the specific ranges as described above, whereby swelling or elongation is less likely to occur during electrolysis of the potassium chloride aqueous solution even without permitting swelling by absorption of water just prior to mounting it in the electrolyzer. Further, it will be less likely to shrink during the electrolysis of the potassium chloride aqueous solution.

<Method for Producing Potassium Hydroxide Aqueous Solution>

The method for producing a potassium hydroxide aqueous solution of the present invention is a method for producing a potassium hydroxide aqueous solution by electrolyzing a potassium chloride aqueous solution by an ion exchange membrane method using the cation exchange membrane.

In the method for producing a potassium hydroxide aqueous solution of the present invention, it is important that the amounts of potassium ions and sodium ions contained in the cation exchange membrane before being in contact with the potassium chloride aqueous solution are within the specific ranges as described above. When the amounts of potassium ions and sodium ions contained in the cation exchange membrane before being in contact with the potassium chloride aqueous solution, are within the specific ranges as described above, the membrane is less likely to undergo swelling or elongation during the electrolysis of the potassium chloride aqueous solution, and also the membrane is less likely to shrink at the time of mounting it in the electrolyzer and supplying the liquids.

During the electrolysis of the potassium chloride aqueous solution, the amounts of potassium ions and sodium ions contained in the cation exchange membrane may be varied under the influence of the potassium chloride aqueous solution or the potassium hydroxide aqueous solution which are in contact with the cation-exchange membrane. However, when the amounts of potassium ions and sodium ions contained in the cation exchange membrane before being in contact with the potassium chloride aqueous solution, are within the specific ranges as described above, the effects of the present invention are sufficiently obtainable during the electrolysis of the potassium chloride aqueous solution.

In the ion exchange membrane method, in an electrolyzer equipped with a cathode and an anode, a cation exchange membrane as a partition membrane, is mounted so as to separate inside of the electrolyzer into a cathode compartment on the cathode side and an anode compartment on the anode side, and a potassium chloride aqueous solution is supplied to the anode compartment and a potassium hydroxide aqueous solution is supplied to the cathode compartment, so that the potassium chloride aqueous solution is electrolyzed while maintaining the concentration of the potassium hydroxide aqueous solution discharged from the cathode compartment to be at a predetermined concentration.

The electrolyzer may be a monopolar type in which a cathode compartment and an anode compartment are arranged alternately with a cation exchange membrane interposed between them, so that the cathode compartments and the anode compartments are electrically in parallel, or may be a bipolar type wherein the rear side of a cathode compartment and the rear side of an anode compartment are electrically connected, so that the respective compartments are electrically in series.

The material constituting the anode compartment is preferably a material which is resistant to potassium chloride and chlorine. As such a material, titanium may be mentioned.

As the material constituting the cathode compartment, a material resistant to potassium hydroxide and hydrogen is preferred. As such a material, stainless steel, nickel, etc. may be mentioned.

At the time of disposing an electrode, the cathode may be disposed in contact with the ion-exchange membrane, or may be spaced at an appropriate distance from the ion-exchange membrane.

The concentration of the potassium chloride aqueous solution to be supplied to the anode compartment is preferably from 150 to 200 g/L, more preferably from 180 to 200 g/L.

The concentration of the potassium hydroxide aqueous solution to be discharged from the cathode compartment is preferably from 20 to 40 mass %, more preferably from 25 to 40 mass %.

The temperature in the electrolyzer is preferably from 50 to 120° C., more preferably from 80 to 95° C.

The current density is preferably from 1 to 6 kA/m$^2$, more preferably from 2 to 6 kA/m$^2$.

(Mechanism of Effects)

In the method for producing a potassium hydroxide aqueous solution as described above, the cation exchange membrane of the present invention which is less likely to be swelled or shrink, is used during the electrolysis of a potassium chloride aqueous solution, whereby it is not required to conduct an operation of permitting the membrane to be swelled by absorption of water immediately before mounting it in the electrolyzer, and it is possible to stably produce a potassium hydroxide aqueous solution.

EXAMPLES

Now, the present invention will be described specifically with reference to Examples, but the invention is by no means limited by these Examples.

Ex. 1 to 3 are Examples of the present invention, and Ex. 4 and 5 are Comparative Examples.

(Amounts of Cations in Cation Exchange Membrane)

The amounts of potassium ions and sodium ions contained in a cation exchange membrane were obtained by washing the membrane of 3 cm×3 cm with ion-exchanged water at 90° C. for 16 hours, and immersing the membrane in 50 mL of a 1N hydrogen chloride aqueous solution at 90° C. for 16 hours to obtain an extract, whereupon the concentrations (mol/L) of the respective cations in the extract were measured by means of an atomic absorption photometer (Z-2310, manufactured by Hitachi High-Technologies Corporation).

(Dimensional Change Rate of Cation Exchange Membrane in Potassium Hydroxide Aqueous Solution)

On the cation exchange membrane after dimension stabilization treatment, two marked lines (distance=200 mm) were drawn. Then, after storing the cation exchange membrane in a constant temperature chamber at 25° C. for 16 hours, the distance L0 between the marked lines was measured by means of a digital caliper. Further, after immersing the cation exchange membrane in a 32 mass % potassium hydroxide aqueous solution at 25° C. for 2 hours, the distance L1 between the marked lines was measured by means of a digital caliper. The dimensional change rate $\Delta L$ (%) was obtained from the following formula.

$$\Delta L = (L1-L0)/L0 \times 100$$

(Dimensional Change Rate of Cation Exchange Membrane in Potassium Chloride Aqueous Solution)

On the cation exchange membrane after dimension stabilization treatment, two marked lines (distance=200 mm) were drawn. Then, after storing the cation exchange membrane in a constant temperature chamber at 25° C. for 16 hours, the distance L0 between the marked lines was measured by means of a digital caliper. Further, after immersing the cation exchange membrane in a 125 g/L potassium chloride aqueous solution at 90° C. for 30 minutes, the distance L1 between the marked lines was measured by means of a telescope-equipped read microscope (a digital cathetometer, manufactured by Nippon Optical Works Co. Ltd.) in a state as immersed in the potassium chloride aqueous solution. The dimensional change rate $\Delta L$ (%) was obtained from the following formula.

$$\Delta L = (L1-L0)/L0 \times 100$$

(Wrinkles of Cation Exchange Membrane)

By an ion exchange membrane method using a cation exchange membrane, a potassium chloride aqueous solution was electrolyzed for 3 days to produce a potassium hydroxide aqueous solution, whereupon the membrane was taken out, and the presence or absence of formation of wrinkles in the cation exchange membrane was confirmed.

Ex. 1

(Preparation of Cation Exchange Membrane)

$CF_2=CF_2$ and $CF_2=CFOCF_2CF_2CF_2COOCH_3$ were copolymerized by a known method to obtain polymer (A'-1) (ion exchange capacity after hydrolysis treatment: 1.00 meq/g dry resin). In the hydrolysis treatment, it was immersed in a solution of dimethyl sulfoxide/potassium hydroxide/water=15/23/62 (mass ratio) at 95° C. for 30 minutes.

$CF_2=CF_2$ and $CF_2=CFOCF_2CF(CF_3)OCF_2CF_2SO_2F$ were copolymerized by a known method to obtain polymer (B'-1) (ion exchange capacity after hydrolysis treatment: 1.0 meq/g dry resin). In the hydrolysis treatment, it was immersed in a solution of dimethyl sulfoxide/potassium hydroxide/water=15/23/62 (mass ratio) at 95° C. for 30 minutes.

$CF_2=CF_2$ and $CF_2=CFOCF_2CF(CF_3)OCF_2CF_2SO_2F$ were copolymerized by a known method to obtain polymer (B'-2) (ion exchange capacity after hydrolysis treatment: 1.1 meq/g dry resin). In the hydrolysis treatment, it was immersed in a solution of dimethyl sulfoxide/potassium hydroxide/water=15/23/62 (mass ratio) at 95° C. for 30 minutes.

Polymer (B'-2) was subjected to hydrolysis treatment and then to treatment for acid-form to obtain fluoropolymer (C-1) (ion exchange capacity: 1.1 meq/g dry resin). In the hydrolysis treatment, it was immersed in a solution of dimethyl sulfoxide/potassium hydroxide/water=15/23/62 (mass ratio) at 95° C. for 30 minutes. In the treatment for acid form, it was immersed in a 2 mol/L hydrochloric acid aqueous solution at 60° C. for 1 hour.

Step (a):

By using a device equipped with two extruders (VS-20 and VS-30, manufactured by Tanabe Plastics Machinery Co., Ltd.), a film die for co-extrusion and a take-off machine, a laminated film (1) having a layer ($\alpha1'$) with a thickness of 13 μm made of polymer (A'-1) and a layer of polymer (B'-1) with a thickness of 25 μm laminated, was obtained at a die temperature of 260° C.

By using a film die for single layer extrusion, a single layer film (2) of polymer (B'-2) with a thickness of 30 μm, and a single layer film (3) of polymer (B'-2) with a thickness of 45 μm were obtained.

A paste comprising 29.0 mass % of zirconium oxide (average particle size: 1 μm), 1.3 mass % of methyl cellulose, 4.6 mass % of cyclohexanol, 1.5 mass % of cyclohexane and 63.6 mass % of water, was applied on a film of polyethylene terephthalate (hereinafter referred to as PET) by a gravure roll method so that the dried weight would be 20 g/m$^2$, followed by drying, to obtain a gas release layer-attached film (4) provided with a gas release layer ($\beta2$).

Using a 100 denier yarn made of PTFE as a reinforcing yarn and a 30 denier 6 filament yarn made of PET as a sacrificial yarn, a woven fabric of plain weave was obtained with a density of reinforcing yarns being 27 yarns/1 inch and a density of sacrificial yarns being 53 yarns/1 inch.

By using a laminated roll composed of a pair of metal rolls and a rubber-lined roll, at a temperature of 200° C. under a linear pressure 40 kg/cm and at a speed of 0.4 m/min, the gas release layer-attached film (4), the film (2), the woven fabric, the film (3) and the laminated film (1) were laminated in this order and integrated, to obtain a precursor for a composite membrane having a gas release layer ($\beta2$) on one side. At that time, the gas release layer-attached film (4) was disposed so that the gas release layer ($\beta2$) faced the film (2) side, and the laminated film (1) was disposed so that the layer of polymer (B'-1) faced the film (3) side.

Step (b):

After peeling off the PET film from the precursor for a composite film, the precursor for a composite membrane was immersed in a solution of dimethyl sulfoxide/potassium hydroxide/water=15/23/62 (mass ratio) at 95° C. for 30 minutes for hydrolysis treatment to convert precursor groups for carboxylic acids and precursor groups for sulfonic acids, respectively, to potassium carboxylate salt and potassium sulfonate salt, followed by drying to obtain a composite membrane.

Step (c):

Fluoropolymer (C-1) was dissolved in ethanol to prepare a 9.5 mass % ethanol solution. To the ethanol solution, 10.8 mass % of zirconium oxide (average primary particle diameter: 0.4 μm) was added, followed by stirring by a ball mill uniformly so that the binder ratio would be 0.2, to obtain a coating solution (D) (average secondary particle diameter of zirconium oxide in the coating solution (D): 0.7 μm).

The coating solution (D) was applied on the surface of the layer (α1) of the composite membrane by a spray method, followed by heating by using a laminated roll composed of a pair of metal rolls and a rubber-lined roll, at a temperature of 135° C., under a linear pressure of 1.5 kg/cm and at a speed 0.04 m/min, to form a gas release layer (α2), thereby to obtain a cation exchange membrane.

Step (d):

A potassium chloride/sodium chloride mixed aqueous solution (concentrations of potassium chloride and sodium chloride were 10 mass % and 2 mass %, respectively) was prepared. The ratio of sodium ions was adjusted to be 20 mol % in the total (100 mol %) of potassium ions and sodium ions in the potassium chloride/sodium chloride mixed aqueous solution. The cation exchange membrane was immersed in the potassium chloride/sodium chloride mixed aqueous solution at 40° C. for 20 minutes to adjust the ratio of potassium ions and sodium ions in the membrane.

The cation exchange membrane was immersed in ion-exchanged water at a temperature 40° C. for dimensional stabilization treatment.

The amounts of potassium ions and sodium ions in the cation exchange membrane, the dimensional change rate of the cation exchange membrane in a potassium hydroxide aqueous solution, and the dimensional change rate of the cation exchange membrane in a potassium chloride aqueous solution, are shown in Table 1.

(Production of Potassium Hydroxide Aqueous Solution)

The cation exchange membrane was mounted in an electrolyzer equipped with a cathode and an anode, so as to separate inside of the electrolyzer into a cathode compartment on the cathode side and an anode compartment on the anode side, and so that the gas release layer (α2) of the cation exchange membrane faced the cathode, and the gas release layer (β2) of the cation exchange membrane faced the anode.

As the electrolyzer, an electrolyzer having an effective current-carrying area of 0.2 m² (vertical: 1 m, horizontal: 0.2 m) was used; as the anode, DSE manufactured by Permelec Electrode Ltd. was used; and as the cathode, a Raney nickel plated cathode manufactured by Chlorine Engineers was used.

Electrolysis of a potassium chloride aqueous solution was conducted at a current density of 6 kA/m² at a temperature of 90° C., by supplying a potassium chloride aqueous solution to the anode compartment while adjusting the concentration to 125 g/L, and supplying water to the cathode compartment while maintaining the concentration of the potassium hydroxide aqueous solution discharged from the cathode compartment to be 32 mass %.

After the operation for three days, electrolysis was terminated, and the cation exchange membrane was taken out, to confirm the presence or absence of formation of wrinkles in the cation exchange membrane.

The results are shown in Table 1 together with the results of the following Ex. 2 to 5.

Ex. 2

A cation exchange membrane having the ratio of potassium ions and sodium ions in the membrane adjusted, was obtained in the same manner as in Ex. 1, except that in step (d), the ratio of sodium ions was adjusted to be 10 mol % in the total (100 mol %) of potassium ions and sodium ions in the potassium chloride/sodium chloride mixed aqueous solution. Further, the production of a potassium hydroxide aqueous solution was carried out in the same manner as in Ex. 1 except that the membrane was changed to the cation exchange membrane of Ex. 2.

Ex. 3

A cation exchange membrane having the ratio of potassium ions and sodium ions in the membrane adjusted, was obtained in the same manner as in Ex. 1, except that in step (d), the ratio of sodium ions was adjusted to be 2 mol % in the total (100 mol %) of potassium ions and sodium ions in the potassium chloride/sodium chloride mixed aqueous solution. Further, the production of a potassium hydroxide aqueous solution was carried out in the same manner as in Ex. 1 except that the membrane was changed to the cation exchange membrane of Ex. 3.

Ex. 4

A cation exchange membrane having the ratio of potassium ions and sodium ions in the membrane adjusted, was obtained in the same manner as in Ex. 1, except that in step (d), the ratio of sodium ions was adjusted to be 50 mol % in the total (100 mol %) of potassium ions and sodium ions in the potassium chloride/sodium chloride mixed aqueous solution. Further, the production of a potassium hydroxide aqueous solution was carried out in the same manner as in Ex. 1 except that the membrane was changed to the cation exchange membrane of Ex. 4.

Ex. 5

A cation exchange membrane was obtained in the same manner as in Ex. 1 except that step (d) was not conducted. Further, the production of a potassium hydroxide aqueous solution was carried out in the same manner as in Ex. 1 except that the membrane was changed to the cation exchange membrane of Ex. 5.

TABLE 1

|  |  | Ex. 1 | Ex. 2 | Ex. 3 | Ex. 4 | Ex. 5 |
| --- | --- | --- | --- | --- | --- | --- |
| Amount of cations in cation exchange membrane [mol %] | Potassium + sodium | 100 | 100 | 100 | 100 | 100 |
|  | Potassium | 80 | 90 | 98 | 50 | 100 |
|  | Sodium | 20 | 10 | 2 | 50 | 0 |

TABLE 1-continued

|  | Ex. 1 | Ex. 2 | Ex. 3 | Ex. 4 | Ex. 5 |
|---|---|---|---|---|---|
| Dimensional change rate of cation exchange membrane in potassium hydroxide aqueous solution [%] | −4.0 | −3.8 | −3.5 | −5.0 | −3.5 |
| Dimensional change rate of cation exchange membrane in potassiumchloride aqueous solution [%] | 2.1 | 2.5 | 2.7 | 1.1 | 3.0 |
| Wrinkles in cation exchange membrane | Absent | Absent | Absent | Absent | Present |

In Ex. 1 to 3 wherein the amounts of potassium ions and sodium ions contained in the cation exchange membrane were within the specific ranges as described above, shrinkage or expansion of the cation exchange membrane was suppressed, and wrinkles were not formed in the cation-exchange membrane.

In Ex. 4 wherein the amount of sodium ions contained in the cation exchange membrane was too large, the degree of shrinkage of the cation exchange membrane was relatively large.

In Ex. 5 wherein no sodium ions were contained in the cation exchange membrane, the degrees of swelling and expansion of the cation exchange membrane were relatively large, and wrinkles were formed in the cation exchange membrane.

INDUSTRIAL APPLICABILITY

The cation exchange membrane of the present invention is useful as a cation exchange membrane to be used in a method for producing a potassium hydroxide aqueous solution by electrolysis of a potassium chloride aqueous solution by an ion-exchange membrane method.

REFERENCE SYMBOLS

1: cation exchange membrane
2: composite membrane
10: gas release layer (α2)
12: layer (α1)
14: layer (β1)
16: gas release layer (β2)

What is claimed is:

1. A cation exchange membrane comprising at least one polymer having cation exchange groups, wherein in cations (100 mol %) contained in the cation exchange membrane, the total of potassium ions and sodium ions is at least 99 mol %, and in the total (100 mol %) of potassium ions and sodium ions contained in the cation exchange membrane, potassium ions are from 80 to 98 mol %, and sodium ions are from 20 to 2 mol %.

2. The cation exchange membrane according to claim 1, wherein the at least one polymer having cation exchange groups is either one or both of a perfluorocarbon polymer having alkali metal salt form carboxylic acid groups and a perfluorocarbon polymer having alkali metal salt form sulfonic acid groups.

3. The cation exchange membrane according to claim 2, which comprises a layer comprising the perfluorocarbon polymer having alkali metal salt form carboxylic acid groups, and a layer comprising the perfluorocarbon polymer having alkali metal salt form sulfonic acid groups.

4. The cation exchange membrane according to claim 3, wherein the ion exchange capacity of the perfluorocarbon polymer having alkali metal salt form carboxylic acid groups is from 0.7 to 1.1 meq/g dry resin, and the ion-exchange capacity of the perfluorocarbon polymer having alkali metal salt form sulfonic acid groups is from 0.9 to 1.15 meq/g dry resin.

5. The cation exchange membrane according to claim 4, wherein the layer comprising the perfluorocarbon polymer having alkali metal salt form carboxylic acid groups and the layer comprising the perfluorocarbon polymer having alkali metal salt form sulfonic acid groups, are in contact with each other, and the difference in ion exchange capacity between the layer comprising the perfluorocarbon polymer having alkali metal salt form carboxylic acid groups and the layer comprising the perfluorocarbon polymer having alkali metal salt form sulfonic acid group, adjacent to each other, is from 0.1 to 0.45 meq/g dry resin.

6. The cation exchange membrane according to claim 3, wherein the thickness of the layer comprising the perfluorocarbon polymer having alkali metal salt form carboxylic acid groups is from 5 to 50 μm, and the thickness of the layer comprising the perfluorocarbon polymer having alkali metal salt form sulfonic acid groups is from 55 to 200 μm.

7. The cation exchange membrane according to claim 3, wherein a reinforcing material is embedded in the layer comprising the perfluorocarbon polymer having alkali metal salt form sulfonic acid groups, and the ion exchange capacity of the layer comprising the perfluorocarbon polymer having alkali metal salt form sulfonic acid groups on an anode side of the reinforcing material, is higher than the ion exchange capacity of the layer comprising the perfluorocarbon polymer having alkali metal salt form sulfonic acid groups on a cathode side of the reinforcing material.

8. The cation exchange membrane according to claim 7, wherein the thickness of the layer comprising the perfluorocarbon polymer having alkali metal salt form sulfonic acid groups on the anode side of the reinforcing material is from 10 to 60 μm.

9. The cation exchange membrane according to claim 1, which comprises a gas release layer on at least either one of an anode side surface and a cathode side surface.

10. The cation exchange membrane according to claim 2, wherein the perfluorocarbon polymer having alkali metal salt form carboxylic acid groups is one obtained by hydrolysis treatment of a copolymer having structural units derived from a monomer represented by formula (1), and structural units derived from a monomer represented by formula (2), and the perfluorocarbon polymer having alkali metal salt form sulfonic acid groups is one obtained by hydrolysis treatment of a copolymer having structural units derived from a monomer represented by formula (1), and structural units derived from a monomer represented by formula (3):

$$CF_2=CX^1X^2 \quad (1)$$

$$CF^2=CF(OCF_2CFX^3)_nO(CF_2)_mY \quad (2)$$

$$CF^2=CF(OCF_2CFX^4)_sO(CF_2)_tW \quad (3)$$

wherein $X^1$ and $X^2$ are each independently a fluorine atom, a chlorine atom or a trifluoromethyl group, $X^3$ is a fluorine atom or a trifluoromethyl group, m is an integer of from 1 to 5, n is 0 or 1, Y is a precursor group which can be converted to a carboxylic acid group by hydrolysis, $X^4$ is a fluorine atom or a trifluoromethyl group, s is an integer of from 1 to 3, t is an integer of from 0 to 2, and W is a precursor group which can be converted to a sulfonic acid group by hydrolysis.

11. The cation exchange membrane according to claim 7, wherein the material of the reinforcing material is polytetrafluoroethylene.

12. The cation exchange membrane according to claim 9, wherein the gas release layer is a layer comprising inorganic particles and a binder.

13. The cation exchange membrane according to claim 12, wherein the inorganic particles are $SiO_2$, SiC, $ZrO_2$ or ZrC, and the binder is methyl cellulose, or a fluoropolymer having carboxylic acid groups or sulfonic acid groups.

14. A method for producing a potassium hydroxide aqueous solution, the method comprising contacting a potassium chloride aqueous solution with the cation exchange membrane as defined in claim 1 to electrolyze the potassium chloride aqueous solution by an ion-exchange membrane method.

15. The method according to claim 14, wherein the concentration of potassium chloride in the potassium chloride aqueous solution is from 150 to 200 g/L, and the concentration of potassium hydroxide in the potassium hydroxide aqueous solution is from 20 to 40 mass %.

* * * * *